United States Patent
Obuchi et al.

(10) Patent No.: US 8,227,060 B2
(45) Date of Patent: Jul. 24, 2012

(54) LACTIC ACID POLYMER COMPOSITION, MOLDED ARTICLE COMPRISING THE COMPOSITION AND PROCESS FOR PRODUCING THE MOLDED ARTICLE

(75) Inventors: Shoji Obuchi, Yokohama (JP); Masaaki Iijima, Ichihara (JP); Takayuki Kuroki, Chiba (JP); Masahiro Sugi, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 1211 days.

(21) Appl. No.: 11/919,654

(22) PCT Filed: May 9, 2006

(86) PCT No.: PCT/JP2006/309344
§ 371 (c)(1),
(2), (4) Date: Oct. 31, 2007

(87) PCT Pub. No.: WO2006/121056
PCT Pub. Date: Nov. 16, 2006

(65) Prior Publication Data
US 2009/0311511 A1 Dec. 17, 2009

(30) Foreign Application Priority Data

May 12, 2005 (JP) ................................. 2005-140148
Jul. 4, 2005 (JP) ................................. 2005-195402
Jul. 6, 2005 (JP) ................................. 2005-196948

(51) Int. Cl.
B32B 27/18 (2006.01)
B32B 27/36 (2006.01)
B32B 38/00 (2006.01)

(52) U.S. Cl. ....... 428/35.7; 428/323; 428/480; 264/299; 264/319; 264/321; 264/330; 264/331.11; 264/345; 524/284

(58) Field of Classification Search .................. None
See application file for complete search history.

(56) References Cited

U.S. PATENT DOCUMENTS

| | | | | |
|---|---|---|---|---|
| 5,916,950 A | * | 6/1999 | Obuchi et al. | 524/492 |
| 6,419,294 B2 | * | 7/2002 | Neubrand | 296/76 |
| 7,084,192 B2 | * | 8/2006 | Ouchi et al. | 523/205 |
| 7,442,735 B2 | * | 10/2008 | Tobita et al. | 524/108 |
| 2002/0002252 A1 | * | 1/2002 | Obuchi et al. | 525/450 |
| 2002/0128344 A1 | * | 9/2002 | Fujihira et al. | 522/162 |
| 2003/0038405 A1 | * | 2/2003 | Bopp et al. | 264/319 |
| 2004/0068059 A1 | * | 4/2004 | Katayama et al. | 525/466 |
| 2005/0001349 A1 | * | 1/2005 | Yosimura et al. | 264/211 |
| 2005/0165142 A1 | * | 7/2005 | Nishimura et al. | 524/210 |

FOREIGN PATENT DOCUMENTS

| | | | |
|---|---|---|---|
| DE | 19829936 | * | 1/2000 |
| EP | 0780428 A | | 6/1997 |
| EP | 1484356 A | | 12/2004 |
| JP | 08-073628 A | | 3/1996 |
| JP | 09-278991 | * | 10/1997 |
| JP | 09-278991 A | | 10/1997 |
| JP | A-2002-146170 | | 5/2002 |
| JP | 2002-173584 | * | 6/2002 |
| JP | 2003-301097 A | | 10/2003 |
| JP | A-2004-204143 | | 7/2004 |
| JP | 2004-345150 | * | 12/2004 |
| WO | WO 03/016015 | * | 2/2003 |
| WO | WO 03/042302 A1 | | 5/2003 |

* cited by examiner

*Primary Examiner* — Vivian Chen
(74) *Attorney, Agent, or Firm* — Buchanan Ingersoll & Rooney PC

(57) ABSTRACT

To provide a lactic acid polymer composition excellent in transparency, heat resistance and productivity, a molded article, a sheet and a multilayer sheet each of which comprises the composition, a thermoformed article obtained by secondary-forming the sheet or the multilayer sheet, and a process for producing the thermoformed article with excellent productivity. The lactic acid polymer composition of the invention comprises 100 parts by weight of a lactic acid polymer (A), 0.1 to 3 parts by weight of an organic crystal nucleating agent (B) comprising an aliphatic carboxylic acid amide having an amide bond, and 0.1 to 7 parts by weight of a crystallization accelerator (C). The thermoformed article of the invention is obtained with excellent production efficiency by thermoforming the sheet comprising the composition of the invention at a temperature of 60 to 130° C.

34 Claims, No Drawings

LACTIC ACID POLYMER COMPOSITION, MOLDED ARTICLE COMPRISING THE COMPOSITION AND PROCESS FOR PRODUCING THE MOLDED ARTICLE

TECHNICAL FIELD

The present invention relates to a lactic acid polymer composition, a molded article comprising the composition, and a process for producing the molded article. More particularly, the invention relates to a lactic acid polymer composition which can be imparted with heat resistance by accelerating crystallization with maintaining transparency, a molded article and a sheet comprising the composition, a thermoformed article obtained by secondary-forming the sheet, and a process for producing the thermoformed article with excellent productivity.

BACKGROUND ART

As materials of molded products made from plastics, there have been conventionally used polystyrene, polyvinyl chloride, polypropylene and polyethylene terephthalate resins. Some of the molded products produced from these resins are excellent in transparency, but if a wrong disposal means is taken, the quantity of the waste is increased. Further, the waste of the molded articles is hardly decomposed in the natural environment, and therefore, if disposal by burying the waste under the ground is made, the waste remains in the ground semi-permanently.

On the other hand, as polymers that are thermoplastic resins and have biodegradability, lactic acid polymers, such as polylactic acid and copolymers of lactic acid and other hydroxycarboxylic acids, have been developed. The lactic acid polymers have characteristics such that they undergo biodegradation of 100% within several months to one year in the bodies of animals and that when they are placed in the soil or seawater, they start biodegradation in several weeks in the wet environment and disappear in about one to several years, and their biodegradation products become lactic acid that is harmless to the human bodies, carbon dioxide and water.

Molded articles (e.g., molded articles having three-dimensional shapes, such as bottles, unstretched films or sheets having two-dimensional shapes, unstretched filaments or yarns having one-dimensional shapes) of such lactic acid polymers are usually non-crystalline immediately after molding, and they are transparent because crystals having sizes almost equal to or larger than the wavelength of light, which cause scattering of light, are rarely present.

The transparent molded articles, however, are usually inferior in heat resistance because they have low glass transition temperature (Tg) and are non-crystalline. For example, containers of non-crystalline polylactic acid have low heat resistance though they are excellent in transparency. Therefore, hot water and microwave oven cannot be used, and their uses have been restricted. If crystallinity of such molded articles is increased in order to enhance heat resistance by filling the molding material in a mold maintained at a temperature in the vicinity of the crystallization temperature in the molding process or by heat-treating (annealing) the non-crystalline molded article after molding, crystals (e.g., spherocrystal) having sizes almost equal to or larger than the wavelength of light, which cause scattering of light, grow rapidly, and the molded article becomes opaque.

Then, it has been studied to enhance heat resistance of sheets or molded articles by adding a crystal nucleating agent to the lactic acid polymer and thereby accelerating crystallization. However, it is difficult to impart heat resistance without inhibiting transparency of the resins themselves.

For example, in Japanese Patent Laid-Open Publication No. 146170/2002 (patent document 1), it is described that a highly practical film is obtained by imparting specific crystalline property to a plasticized polylactic acid resin containing a plasticizer and a crystal nucleating agent as essential components. In this method, however, transparency is markedly lowered because particle diameters of the crystal nucleating agent added are large or the quantity of the nucleating agent added is large, and therefore, it is difficult to obtain a sheet or a molded article having excellent transparency.

In Japanese Patent Laid-Open Publication No. 278991/1997 (patent document 2), a molded article which has been imparted with transparency and crystalline properties by molding a composition comprising at least one transparent nucleating agent selected from the group consisting of an aliphatic carboxylic acid amide, an aliphatic carboxylic acid salt, an aliphatic alcohol and an aliphatic carboxylic acid ester, and a lactic acid polymer, and carrying out heat treatment during or after the molding, and a process for producing the molded article are described. In this case, however, crystallization takes a long time, and hence, such a level that the process can be carried out industrially is not reached from the viewpoint of productivity.

In Japanese Patent Laid-Open Publication No. 204143/2004 (patent document 3), technique relating to a composition comprising biodegradable polyester and layered silicate and a molded product using the composition is disclosed. In this method, however, it is difficult to finely control the dispersed state of the layered silicate to such a degree that transparency is not inhibited, and it is difficult to attain high transparency.

Patent document 1: Japanese Patent Laid-Open Publication No. 146170/2002
Patent document 2: Japanese Patent Laid-Open Publication No. 278991/1997
Patent document 3: Japanese Patent Laid-Open Publication No. 204143/2004

DISCLOSURE OF THE INVENTION

Problem to be Solved by the Invention

The present invention is intended to solve such problems associated with the prior art as described above, and it is an object of the invention to provide a lactic acid polymer composition excellent in transparency, heat resistance and productivity, a molded article comprising the composition and a process for producing the molded article with excellent productivity. More particularly, the object of the invention is to provide a lactic acid polymer composition which can be sufficiently controlled in its crystallinity and crystal size so as to be imparted with heat resistance, a molded article, a sheet and a multilayer sheet each of which comprises the composition, a thermoformed article obtained by secondary-forming the sheet or the multilayer sheet, and a process for producing the thermoformed article with excellent productivity.

Means to Solve the Problem

The present inventors have found that when a lactic acid polymer composition is heat-treated under certain conditions to perform crystallization, addition of a specific amount of a crystal nucleating agent makes it possible to control the size of a crystal to thereby maintain transparency, and addition of a specific amount of a crystallization accelerator makes it possible to remarkably increase the rate of crystallization without substantially impairing mechanical properties of the lactic acid polymer composition and with maintaining the mechanical properties. Further, they have also found that a thermoformed article having excellent heat resistance and transparency can be obtained with excellent production efficiency by allowing a sheet comprising such a lactic acid polymer composition to have a specific crystallinity and then secondary-forming the sheet. Based on the finding, the present invention has been accomplished.

That is to say, the first lactic acid polymer composition of the present invention comprises 100 parts by weight of a lactic acid polymer (A), 0.1 to 3 parts by weight of an organic crystal nucleating agent (B) comprising an aliphatic carboxylic acid amide having an amide bond, and 0.1 to 7 parts by weight of a crystallization accelerator (C).

The organic crystal nucleating agent (B) is preferably an ethylenebiscarboxylic acid amide. The content of the crystallization accelerator (C) is preferably in the range of 0.5 to 7 parts by weight.

The second lactic acid polymer composition of the present invention comprises 100 parts by weight of a lactic acid polymer (A), 0.1 to 3 parts by weight of an organic crystal nucleating agent (B) comprising a mixture of two or more kinds of aliphatic carboxylic acid amides having two or more amide bonds, and 0.1 to 7 parts by weight of a crystallization accelerator (C).

In the first and the second lactic acid polymer compositions of the invention, it is preferable that the lactic acid polymer (A) is polylactic acid, the organic crystal nucleating agent (B) comprises a mixture of two or more kinds of ethylenebiscarboxylic acid amides, and the crystallization accelerator (C) is at least one compound selected from the group consisting of phthalic acid derivatives, isophthalic acid derivatives, adipic acid derivatives, maleic acid derivatives, citric acid derivatives, itaconic acid derivatives, oleic acid derivatives, ricinolic acid derivatives, phosphoric acid esters, hydroxypolycarboxylic acid esters and polyhydric alcohol esters.

The molded article of the present invention comprises the above-mentioned lactic acid polymer composition of the invention, and the retention of volume of the molded article is preferably not less than 90% when the molded article is kept at 90° C.

The sheet of the present invention comprises the above-mentioned lactic acid polymer composition of the invention, and the mean dispersed particle diameter of the organic crystal nucleating agent (B) in the sheet after the sheet is heated at a temperature of 60 to 130° C. for 5 to 120 seconds is preferably in the range of 0.01 to 1.0 µm. The multilayer sheet of the present invention comprises at least one layer of the above-mentioned sheet.

The thermoformed article of the present invention is obtained by secondary-forming the above-mentioned sheet or multilayer sheet of the invention, and the retention of volume of the thermoformed article is preferably not less than 90% when the thermoformed article is kept at 90° C.

The process for producing a thermoformed article of the present invention comprises heating the above-mentioned sheet or multilayer sheet of the invention to a temperature of 60 to 130° C. to allow the sheet comprising the lactic acid polymer composition to have a crystallinity of 20 to 50% and then secondary-forming the sheet or the multilayer sheet. The heating time for heating the sheet or the multilayer sheet to a temperature of 60 to 130° C. to allow the sheet comprising the lactic acid polymer composition to have a crystallinity of 20 to 50% is preferably in the range of 1 to 60 seconds though it varies depending upon a thermoforming method. The thermoformed article obtained by this process has heat shrinkage resistance of not lower than 65° C.

Effect of the Invention

According to the present invention, a lactic acid polymer composition excellent in transparency, heat resistance and productivity, a molded article, a sheet and a multilayer sheet each of which comprises the composition, and a thermoformed article obtained by secondary-forming the sheet or the multilayer sheet can be provided. According to the present invention, further, the molded article or the thermoformed article can be produced by a process of excellent production efficiency.

BEST MODE FOR CARRYING OUT THE INVENTION

The lactic acid polymer composition of the invention, the molded article, the sheet and the multilayer sheet each of which comprises the composition, the thermoformed article obtained by secondary-forming the sheet or the multilayer sheet, and the process for producing the thermoformed article are described in detail hereinafter. The sheet referred to in the invention means both of a sheet and a film each having a thickness of about 10 µm to 10 mm.

[Lactic Acid Polymer Composition]

The lactic acid polymer composition of the invention comprises (A) a lactic acid polymer, (B) an organic crystal nucleating agent and (C) a crystallization accelerator. More Specifically, the first embodiment is a composition comprising 100 parts by weight of (A) a lactic acid polymer, 0.1 to 3 parts by weight of (B) an organic crystal nucleating agent comprising an aliphatic carboxylic acid amide having an amide bond, and 0.1 to 7 parts by weight of (C) a crystallization accelerator. The second embodiment is a composition comprising 100 parts by weight of (A) a lactic acid polymer, 0.1 to 3 parts by weight of (B) an organic crystal nucleating agent comprising a mixture of two or more kinds of aliphatic carboxylic acid amides having two or more amide bonds, and 0.1 to 3 parts by weight of (C) a crystallization accelerator.

(A) Lactic Acid Polymer

The lactic acid polymer (A) for use in the invention is a polymer containing lactic acid units in amounts of not less than 50% by mol, preferably not less than 75% by mol, and examples of such polymers include (1) polylactic acid or a lactic acid/another aliphatic hydroxycarboxylic acid copolymer, (2) lactic acid polymers containing polyfunctional polysaccharides and lactic acid units, (3) lactic acid polymers containing aliphatic polycarboxylic acid units, aliphatic polyhydric alcohol units and lactic acid units and (4) mixtures of these compounds. Of these, preferable are polylactic acid and a lactic acid/another aliphatic hydroxycarboxylic acid copolymer, and more preferable is polylactic acid, taking into account transparency and heat resistance at the time of using. As the lactic acid, L-lactic acid and D-lactic acid exist, and in the case where a mere lactic acid is referred to in the invention, it means both of the L-lactic acid and the D-lactic acid unless otherwise noted.

As raw materials of the lactic acid polymers (A), lactic acids and hydroxycarboxylic acids are employed. As the lactic acids, L-lactic acid, D-lactic acid, a mixture thereof and lactide that is a cyclic dimer of lactic acid are employable. Of the lactic acid polymers using such lactic acids as raw materials, those having a higher content of L-lactic acid or D-lactic acid are preferable in order to exhibit high crystalline property. More specifically, the content of L-lactic acid or D-lactic acid in the lactic acid units is preferably not less than 90%, more preferably not less than 95%, particularly preferably not less than 98%.

The hydroxycarboxylic acids employable in combination with the above lactic acids are preferably hydroxycarboxylic acids of 2 to 10 carbon atoms. More specifically, glycolic acid, 3-hydroxybutyric acid, 4-hydroxybutyric acid, 4-hydroxyvaleric acid, 5-hydroxyvaleric acid, 6-hydroxycaproic acid, etc. can be preferably employed. Further, cyclic ester intermediates of hydroxycarboxylic acids, such as glycolide that is a dimer of glycolic acid and ε-caprolactone that is a cyclic ester of 6-hydroxycaproic acid, are also employable. For the mixtures of lactic acids and hydroxycarboxylic acids that are raw materials, the lactic acids and the hydroxycarboxylic acids can be used in various combinations so that the lactic acid content in the resulting copolymer should become not less than 50%, preferably not less than 75%.

In order to obtain the lactic acid polymer (A), a publicly known, publicly worked process is employable. For example, a process in which the above raw materials are directly dehydration-polycondensed, or a process in which the cyclic dimers of the lactic acids or the hydroxycarboxylic acids, such as lactide and glycolide, or cyclic ester intermediates, such as ε-caprolactone, are ring-opening polymerized is employable.

In the case of production by the direct dehydration polycondensation, the raw material, i.e., lactic acid or a mixture of lactic acid and hydroxycarboxylic acid, is polymerized by azeotropic dehydration condensation preferably in the presence of an organic solvent, whereby a high-molecular weight lactic acid polymer having strength suitable for the invention is obtained. In particular, it is preferable that a phenyl ether solvent is used as an organic solvent, water is removed from the solvent obtained by the azeotropic distillation, and the solvent in the substantially anhydrous state is returned to the reaction system.

The weight-average molecular weight (Mw) of the lactic acid polymer (A) is in the range of preferably 30,000 to 5,000,000, more preferably 50,000 to 1,000,000, still more preferably 100,000 to 300,000, particularly preferably 100,000 to 200,000. The degree of dispersion (Mw/Mn) of the lactic acid polymer (A) is in the range of 2 to 10, preferably 2 to 8, more preferably 2 to 6, still more preferably 2 to 4, particularly preferably 2 to 3. When the weight-average molecular weight (Mw) and the degree of dispersion (Mw/Mn) of the lactic acid polymer are in the above ranges, a lactic acid polymer composition having a high rate of crystallization and moldability is obtained.

In the lactic acid polymer composition of the invention, other resins may be blended within limits not detrimental to the object of the present invention, in addition to the lactic acid polymer (A).

(B) Organic Crystal Nucleating Agent

The organic crystal nucleating agent (B) in the invention is present in the lactic acid polymer composition, becomes a crystal nucleus when heat treatment is carried out under certain conditions, and contributes to acceleration of crystallization. In the use thereof, it is preferable to keep transparency by controlling the size and the number of crystals.

The organic nucleating agent (B) for use in the invention is an organic compound comprising an aliphatic carboxylic acid amide having an amide bond.

As such compounds, there can be specifically mentioned fatty acid amides having an amide bond in a molecule, e.g., aliphatic carboxylic acid monoamides of 8 to 30 carbon atoms, such as capric acid amide, stearic acid amide, oleic acid amine, erucic acid amid and behenic acid amide; and aliphatic carboxylic acid bisamides, such as methylenebisstearic acid amide, ethylenebislauric acid amide, ethylenebiscapric acid amide, ethylenebisoleic acid amide, ethylenebisstearic acid amide, ethylenebiserucic acid amide, ethylenebisbehenic acid amide, ethylenebisisostearic acid amide, ethylenebishydroxystearic acid amide, butylenebisstearic acid amide, hexamethylenebisoleic acid amide, hexamethylenebisstearic acid amide, hexamethylenebisbehenic acid amide and hexamethylenebishydroxystearic acid amide.

The above organic crystal nucleating agents (B) may be used singly or in combination of two or more kinds. When the lactic acid polymer (A) is polylactic acid, preferable are ethylenebisstearic acid amide, ethylenebislauric acid amide, ethylenebisoleic acid amide and hexamethylenebisbehenic acid amide. When the lactic acid polymer (A) is a copolymer of lactic acid and another aliphatic hydroxycarboxylic acid or a copolymer containing lactic acid units, other aliphatic polycarboxylic acid units and aliphatic polyhydric alcohol units, preferable are aliphatic carboxylic acid monoamides, such as stearic acid amide, oleic acid amide and erucic acid amide.

In the second embodiment of the lactic acid polymer composition of the invention, an organic crystal nucleating agent (B) comprising two or more different kinds of aliphatic carboxylic acid amides having two or more amide bonds is used. By the use of such an organic crystal nucleating agent, the organic crystal nucleating agents are independently dispersed, and a great effect of accelerating crystallization is obtained with keeping transparency.

Examples of the aliphatic carboxylic acid amides having two or more amide bonds for use in the second embodiment of the composition of the invention include methylenebisstearic acid amide, ethylenebislauric acid amide, ethylenebiscapric acid amide, ethylenebisoleic acid amide, ethylenebisstearic acid amide, ethylenebiserucic acid amide, ethylenebisbehenic acid amide, ethylenebisisostearic acid amide, ethylenebishydroxystearic acid amide, butylenebisstearic acid amide, hexamethylenebisoleic acid amide, hexamethylenebisstearic acid amide, hexamethylenebisbehenic acid amide and hexamethylenebishydroxystearic acid amide.

Although any two or more kinds of the above compounds may be used in combination, use of a mixture of at least two compounds selected from ethylenebisstearic acid amide, ethylenebislauric acid amide and ethylenebisoleic acid amide is inexpensive and effective.

In the first embodiment of the lactic acid polymer composition of the invention, the whole amount of the organic crystal nucleating agent (B) added is in the range of 0.1 to 3 parts by weight, preferably 0.1 to 1.5 parts by weight, more preferably 0.2 to 1.0 part by weight, based on 100 parts by weight of the lactic acid polymer (A). In the second embodiment of the lactic acid polymer composition of the invention, the whole amount of the organic crystal nucleating agent (B) added is in the range of 0.1 to 3 parts by weight, preferably 0.3 to 2 parts by weight, more preferably 0.5 to 1.5 parts by weight, based on 100 parts by weight of the lactic acid polymer (A).

(C) Crystallization Accelerator

The crystallization accelerator (C) in the invention means an agent having an action of increasing a rate of crystallization when the lactic acid polymer composition is crystallized by some method (e.g., heat treatment). The crystallization accelerator (C) preferably has such an effect that the transparency of the lactic acid polymer (A) is not substantially impaired.

Examples of the crystallization accelerators (C) include phthalic acid derivatives, such as di-n-octyl phthalate, di-2-ethylhexyl phthalate, dibenzyl phthalate, diisodecyl phthalate, ditridecyl phthalate and diundecyl phthalate; isophthalic acid derivatives, such as dioctyl isophthalate; adipic acid derivatives, such as di-n-butyl adipate and dioctyl adipate; maleic acid derivatives, such as di-n-butyl maleate; citric acid derivatives, such as tri-n-butyl citrate; itaconic acid derivatives, such as monobutyl itaconate; oleic acid derivatives, such as butyl oleate; ricinolic acid derivatives, such as glycerol monoricinoleate; phosphoric acid esters, such as tricresyl phosphate and trixylenyl phosphate; hydroxypolycarboxylic acid esters, such as polyethylene adipate and polyacrylate acetyl tributyl citrate; polyhydric alcohol esters, such as glycerol triacetate and glycerol tripropionate; polyalkylene glycol derivatives, such as polyethylene glycol and polypropylene glycol; and benzyl=2-(2-methylethoxy)ethyl=adipate.

Of these, citric acid derivatives, polyalkylene glycol derivatives, hydroxypolycarboxylic acid esters and polyhydric alcohol esters, which exhibits an effect of increasing a rate of crystallization even in a small amount and are inexpensive and easily available, are preferably employed.

More specifically, polyethylene glycol, ATBC (trade name, available from J-PLUS Co., Ltd.), Daifatty 101 (trade name, available from Daihachi Chemical Industry Co., Ltd.), Rikemal PL-710 (trade name, available from Riken Vitamin Co., Ltd), Lactcizer GP-4001 (trade name, available from Arakawa Chemical Industries, Ltd.), etc. can be preferably employed because they are inexpensive and easily available and exhibit a high effect of accelerating crystallization.

In the first embodiment of the lactic acid polymer composition of the invention, the amount of the crystallization accelerator (C) added is in the range of 0.1 to 7 parts by weight, preferably 0.5 to 7 parts by weight, more preferably 1 to 5 parts by weight, still more preferably 1 to 3 parts by weight, based on 100 parts by weight of the lactic acid polymer (A).

In the second embodiment of the lactic acid polymer composition of the invention, the amount of the crystallization accelerator (C) added is in the range of 0.1 to 7 parts by weight, preferably 0.3 to 5 parts by weight, more preferably 0.5 to 3 parts by weight, based on 100 parts by weight of the lactic acid polymer (A).

If a large amount of the organic crystal nucleating agent (B) is added, diameters of the dispersed particles of the organic crystal nucleating agent (B) generally become larger because of aggregation, and the number of the nucleating agent that function effectively is decreased to thereby lower the effect of accelerating crystallization. In the present invention, by adding the crystallization accelerator (C) in the above amount, aggregation of the organic crystal nucleating agent (B) added is prevented, and a great effect of accelerating crystallization is obtained in a short period of time with keeping transparency.

(D) Other Additives

In the lactic acid polymer composition of the invention and a molded article comprising the composition, particularly a sheet, an anti-blocking agent, a lubricant, a mold release agent and other additives (plasticizer, antistatic agent, antifogging agent, ultraviolet light absorber, antioxidant, impact resistance improver, etc.) may be contained, when needed. These additives may be added singly or as a mixture.

As the anti-blocking agent, a publicly known, publicly worked one is employable, and an inorganic filler is preferably employed. Examples of the inorganic fillers include silica, calcium carbonate, titania, mica and talc. Of these, silica is particularly preferable.

The mean particle diameter of the anti-blocking agent is not more than 5 μm, preferably not more than 4 μm, more preferably not more than 3 μm, still more preferably not more than 2 μm. If the mean particle diameter exceeds 5 μm, fine irregularities are produced on the surface of the resulting film, and appearance of the film sometimes becomes opaque.

When the resulting molded article, particularly a sheet, needs high transparency, it is desirable to use silica having a mean particle diameter of preferably 7 nm to 2000 nm, more preferably 7 nm to 200 nm, still more preferably 7 nm to 50 nm. Further, it is preferable that the silica contains $SiO_2$ in an amount of not less than 95%, and it is more preferable that the $SiO_2$ is anhydrous silica.

The anti-blocking agent is used in an amount of 0.01 to 3 parts by weight, preferably 0.05 to 2 parts by weight, more preferably 0.05 to 1 part by weight, based on 100 parts by weight of the lactic acid polymer (A). If the amount added is too small, the effect of the anti-blocking agent is hardly exerted. To the contrary, if the amount added is too large, appearance of the film, particularly transparency, is sometimes lowered.

As the lubricant used for a molded article comprising the lactic acid polymer composition of the invention, particularly a sheet, a publicly known, publicly worked one is employable. Examples of such lubricants include aliphatic hydrocarbon type lubricants, such as liquid paraffin, microcrystalline wax, natural paraffin, synthetic paraffin and polyethylene; fatty acid type lubricants, such as stearic acid, lauric acid, hydroxystearic acid and hardened castor oil; metallic soap type lubricants that are fatty acid metal salts of 12 to 30 carbon atoms, such as lead stearate, calcium stearate and calcium hydroxystearate; long-chain ester waxes, such as montan wax; and composite lubricants that are composites of these lubricants.

The amount of the lubricant used is in the range of 0.1 part by weight to 2 parts by weight, preferably 0.2 part by weight to 1.5 parts by weight, more preferably 0.3 part by weight to 1 part by weight, based on 100 parts by weight of the lactic acid polymer (A). If the amount added is too small, slip properties of the resulting molded article, such as a sheet, are not exerted in some cases. To the contrary, if the amount added is too large, moldability into a sheet is lowered, whereby flatness of the resulting sheet is lowered. Moreover, transparency is sometimes lowered.

When the lubricant and the anti-blocking agent are used in combination, the total amount of the lubricant and the anti-blocking agent is in the range of 0.2 to 7 parts by weight based on 100 parts by weight of the lactic acid polymer, and each amount does not exceed the upper limit of the aforesaid range. If the total amount of the lubricant and the anti-blocking agent is too small, the weathering resistance-lasting effect is not exhibited. If the total amount thereof is too large, molding sometimes becomes unstable, or appearance of the resulting film is sometimes deteriorated.

In order to improve moldability in the molding process, a publicly known, publicly worked mold release agent can be added in the invention. The mold release agent used is not specifically restricted so long as the features of the lactic acid polymer composition of the invention are not impaired. Examples of the mold release agents include silicon derivatives, Teflon (registered trademark) derivatives, aliphatic carboxylic acids, aliphatic carboxylic acid metal salts and aliphatic alcohols. Particularly, silicon derivatives and aliphatic carboxylic acids which exert a high mold release effect are preferable.

Of the silicon derivatives, a dimethyl silicone oil is particularly preferable, and its solution viscosity is in the range of 0.5 to 500,000 centistokes, preferably 1 to 10,000 centistokes, more preferably 5 to 5000 centistokes, still more preferably 5 to 1000 centistokes. Examples of such dimethyl silicone oils include KF96 (trade name, available from Shin-Etsu Chemical Co., Ltd.), KF69 (trade name, available from Shin-Etsu Chemical Co., Ltd.) and KMP110 (trade name, available from Shin-Etsu Chemical Co., Ltd.).

The aliphatic carboxylic acids are aliphatic carboxylic acids of 8 to 30 carbon atoms, preferably aliphatic carboxylic acids of 10 to 26 carbon atoms, more preferably aliphatic carboxylic acids of 12 to 22 carbon atoms.

The mold release agent is used in an amount of 0.01 part by weight to 1 part by weight, preferably 0.05 part by weight to 0.8 part by weight, more preferably 0.1 part by weight to 0.5 part by weight, based on 100 parts by weight of the lactic acid polymer composition.

In order to improve impact resistance of a molded article, a publicly known, publicly worked impact resistance improver can be added in the invention. The impact resistance improver used is not specifically restricted so long as the features of the lactic acid polymer composition of the invention are not impaired. Examples of the impact resistance improvers include impact resistance improvers having biodegradability and non-biodegradable thermoplastic elastomers. Particularly, impact resistance improvers having biodegradability are preferable.

Examples of the impact resistance improvers having biodegradability include Plamate PD-150 (trade name, available from Dainippon Ink & Chemicals, Inc.) and Plamate PD-350 (trade name, available from Dainippon Ink & Chemicals, Inc.). Examples of the non-biodegradable thermoplastic elastomers include olefin elastomers or rubbers, such as Toughmer (trade name, available from Mitsui Chemicals, Inc.), syndiotactic polypropylene, ethylene/propylene/diene rubber, SBBS rubber of styrene/butadiene/butylene/styrene type, imino modified SBBS rubber, SEBS rubber of styrene/ethylene/butylene/styrene type, and imino modified SEBS rubber; and silicon rubbers, such as Metabren (trade name, available from Mitsubishi Rayon Co, Ltd.).

The above impact resistance improvers may be used singly or in combination of two or more kinds. Although the amount of the impact resistance improver added can be properly selected according to the use application, it is in the range of 0.1 part by weight to 20 parts by weight, preferably 1 part by weight to 15 parts by weight, more preferably 3 parts by weight to 10 parts by weight, based on 100 parts by weight of the lactic acid polymer composition.

<Process for Preparing Lactic Acid Polymer Composition>

The lactic acid polymer composition of the invention can be obtained by mixing the lactic acid polymer (A), the organic crystal nucleating agent (B), the crystallization accelerator (C), and if necessary, other additions, such as anti-blocking agent, lubricant, mold release agent and impact resistance improver. To the mixing of the components, publicly known, publicly worked methods or blending technique are applicable. For example, there can be mentioned:

(1) a method in which the lactic acid polymer (A) in the form of a powder or pellets, the organic crystal nucleating agent (B), the crystallization accelerator (C), and if necessary, other additives are mixed together by a ribbon blender or the like and then the mixture (composition) is extruded and pelletized by a twin-screw extruder with melting the composition by heating, (2) a method in which when the lactic acid polymer (A) in the form of a powder or pellets is extruded and pelletized, the organic crystal nucleating agent (B), the crystallization accelerator (C), and if necessary, other additives are fed into a cylinder of an extruder by means of a side feeder or a liquid pouring pump, followed by mixing, (3) a method in which the organic crystal nucleating agent (B), the crystallization accelerator (C), and if necessary, other additives are previously extruded and pelletized in high concentrations to prepare pellets (master batch), then the master batch is diluted with the lactic acid polymer (A) in the form of a powder or pellets by dry blending or the like, and the resulting blend is molded into a molded article, and (4) a method in which mixing is carried out by combining the above methods.

In the case where the organic crystal nucleating agent (B), the crystallization accelerator (C), and if necessary, other additives are added as master batch, they may be added as master batches of individual additives or may be added as two or more kinds of master batches of additives, and the way to add them as master batch is not restricted at all. When they are added as master batch, the mixing ratio of the master batch to the lactic acid polymer (A) is as follows. That is to say, the weight ratio of master batch/lactic acid polymer (A) is in the range of 1/100 to 1/2, preferably 1/50 to 1/3, more preferably 1/30 to 1/5, particularly preferably 1/30 to 1/10.

[Molded Article]

The molded article of the invention comprises the lactic acid polymer composition comprising the lactic acid polymer (A), the organic crystal nucleating agent (B), the crystallization accelerator (C), and if necessary, other additives, and the molded article is produced by a publicly known, publicly worked molding process, such as injection molding, extrusion, blow molding, contour extrusion, inflation or press molding.

<Sheet>

The sheet of the invention comprises the lactic acid polymer composition comprising the lactic acid polymer (A), the organic crystal nucleating agent (B), the crystallization accelerator (C), and if necessary, other additives, and the sheet can be produced by an extruder or extrusion technique publicly known and publicly worked. Further, by carrying out stretching when necessary, a stretched sheet can be produced.

On the surface of the sheet of the invention comprising the lactic acid polymer composition, a layer having a function, such as antistatic property, anti-fogging property, tackiness, gas barrier property, adhesion or ease of bonding, can be formed by coating, when needed. For example, an antistatic layer can be formed by applying an aqueous coating solution containing an antistatic agent onto one or both surfaces of the sheet and drying the coating solution. Further, on the surface of the sheet of the invention, a layer having a function, such as antistatic property, anti-fogging property, tackiness, gas barrier property, adhesion or ease of bonding, can be formed by laminating another resin or another sheet, when needed. In this case, a publicly known method, such as extrusion lamination or dry lamination, is employable.

<Multilayer Sheet>

The multilayer sheet of the invention comprises at least one layer of the sheet comprising the lactic acid polymer composition which comprises the lactic acid polymer (A), the organic crystal nucleating agent (B), the crystallization accelerator (C), and if necessary, other additives. Other layers may be layers of, for example, biodegradable polyesters or other general-purpose resins, and can be properly selected according to the use application.

Examples of the biodegradable polyesters include (1) polylactic acid and a lactic acid/another aliphatic hydroxycarboxylic acid copolymer, (2) lactic acid polymers containing polyfunctional polysaccharides and lactic acid units, (3) lactic acid polymers containing aliphatic polycarboxylic acid units, aliphatic polyhydric alcohol units and lactic acid units and (4) mixtures of these compounds, which are described previously; aliphatic polyesters composed of aliphatic polycarboxylic acids and aliphatic polyhydric alcohols, such as polyethylene succinate, polybutylene succinate and polybutylene succinate adipate, and their derivatives; and polyesters having biodegradability, such as polyethylene terephthalate adipate, polybutylene terephthalate adipate and aliphatic polyester carbonate. Especially in the case of the later-described secondary-formed articles requiring transparency, safety, cost and rigidity, such as containers, polylactic acid can be preferably employed.

The layer structure of the multilayer sheet of the invention is not specifically restricted provided that at least one layer (x) comprising the lactic acid polymer composition of the invention is included. For example, a two-layer structure of layer (x)/layer (y), or a three-layer structure of layer (x)/layer (y)/layer (x) or layer (y)/layer (x)/layer (y) can be adopted, and the layer structure is properly selected according to the use application of the multilayer sheet.

For example, if the multilayer sheet is formed into the later-described thermoformed article and if a mold temperature is higher than the glass transition temperature of a layer to be brought into contact with the mold, more specifically, if the layer to be brought into contact with the mold is composed of polylactic acid (Tg=about 60° C.) and the mold temperature is not lower than 60° C., the multilayer sheet preferably has a layer structure in which the layer (x) composed of the lactic acid polymer composition of the invention is present as at least a surface layer. In the case of, for example, a two-layer sheet using the layer composed of the lactic acid polymer composition of the invention as an outermost layer, a layer structure of layer (x)/layer (y) is adoptable, and in the case of a three-layer sheet, a layer structure of layer (x)/layer (y)/layer (x) is adoptable.

When the aforesaid additives are added, they can be added to all the layers or only one of the inner layer, the outer layer and the intermediate layer, and the layer to which the additives are added can be properly selected according to the purpose. For example, in order to impart slip properties to the sheet, it is preferable to add a lubricant or an anti-blocking agent to the innermost layer only, and in this case, slip properties can be efficiently exerted in a relatively small amount.

The layer thickness ratio is as follows. In the case of a two-layer structure, the thickness ratio of layer (x)/layer (y), x/y, is in the range of 0.05 to 0.95/0.95 to 0.05, preferably 0.2 to 0.8/0.8 to 0.2, more preferably 0.3 to 0.7/0.7 to 0.3. In the case of a three-layer structure, the thickness ratio of layer (x)/layer (y)/layer (x), x/y/x, is in the range of 0.05 to 0.6/0.05 to 0.9/0.05 to 0.6, preferably 0.05 to 0.5/0.2 to 0.7/0.05 to 0.5, more preferably 0.1 to 0.4/0.3 to 0.5/0.1 to 0.4.

The multilayer sheet of the invention can be produced by an extruder or extrusion technique publicly known and publicly worked. Further, by carrying out stretching when necessary, a stretched sheet can be produced.

For producing the multilayer sheet of the invention, it is preferable to mold the resin composition into a sheet by means of melt extrusion using an extruder equipped with a T-die. In this case, different resin compositions may be separately molded into sheets, followed by bonding them together, or they are subjected to co-extrusion using an extruder equipped with a multi-manifold die or a feed block. By stretching the resulting multilayer sheet in the direction of flow by means of roll stretching, a multilayer stretched sheet can be produced. Further, the multilayer sheet may be stretched in the cross direction by means of tenter stretching, or after the crosswise stretching, the stretched sheet may be heat-treated under tension.

On the surface of the multilayer sheet of the invention, a layer having a function, such as antistatic property, anti-fogging property, tackiness, gas barrier property, adhesion or ease of bonding, can be formed by coating, when needed. For example, an antistatic layer can be formed by applying an aqueous coating solution containing an antistatic agent onto one or both surfaces of the multilayer sheet and drying the coating solution. Further, on the surface of the multilayer sheet of the invention, a layer having a function, such as antistatic property, anti-fogging property, tackiness, gas barrier property, adhesion or ease of bonding, can be formed by laminating another resin or another sheet, when needed. In this case, a publicly known method, such as extrusion lamination or dry lamination, is employable.

<Thermoformed Article>

The thermoformed article of the invention is obtained by thermoforming a non-crystalline or moderately crystallized sheet comprising the lactic acid polymer composition of the invention or a multilayer sheet including the sheet, with carrying out crystallization before or during thermoforming. The thermoformed article is excellent in transparency and heat resistance.

In order to secondary-form a sheet comprising a lactic acid polymer composition containing the organic crystal nucleating agent (B), the sheet is usually heated to a temperature between the glass transition temperature and the melting point, for example, a temperature of 60° C. to 130° C. in the case where the lactic acid polymer is polylactic acid, and in this instance, aggregation of the organic crystal nucleating agent (B) proceeds and transparency is sometimes lowered. On the other hand, the sheet comprising the lactic acid polymer composition of the invention contains the organic crystal nucleating agent (B) for the purpose of accelerating crystallization but uses the crystallization accelerator (C) in combination, whereby the dispersed particle diameters of the organic crystal nucleating agent (B) are limited to small to thereby keep transparency.

After the sheet or the multilayer sheet of the invention is heated to a temperature between the glass transition temperature and the melting point of the lactic acid polymer, for example, a temperature of 60° C. to 130° C. in the case where the lactic acid polymer is polylactic acid, for 1 second to 60 seconds, the mean dispersed particle diameter of the organic crystal nucleating agent (B) and the crystallization accelerator (C) is in the range of 0.01 μm to 1.0 μm, preferably 0.05 μm to 0.5 μm, more preferably 0.1 μm to 0.5 μm.

In order that the thermoformed article obtained from the sheet or the multilayer sheet of the invention may have sufficient heat resistance, it is necessary to heat the sheet composed of the lactic acid polymer composition of the invention to a temperature between the glass transition temperature and the melting point, for example, a temperature of 60° C. to 130° C., preferably 70° C. to 120° C., more preferably 80° C. to 110° C., still more preferably 80° C. to 100° C., in the case where the lactic acid polymer is polylactic acid, to highly crystallize the sheet. In this case, the crystallinity is not less than 20%, preferably 20% to 50%, more preferably 25% to 45%, still more preferably 25% to 40%, particularly preferably 25% to 35%. By setting the crystallinity of the sheet composed of the lactic acid polymer composition in the above range and then secondary-forming the sheet, formability becomes excellent and a thermoformed article having sufficient heat resistance is obtained. By the use of the lactic acid polymer composition of the invention, further, the above crystallinity can be attained in an extremely short period of time, so that a thermoformed article can be obtained with excellent production efficiency.

The method to heat the sheet or the multilayer sheet of the invention varies depending upon such various thermoforming processes as described later, and for example, there can be mentioned a method of heating the sheet by radiation heat of a heater or a method of heating the sheet by bringing the sheet into contact with a heated metal plate or the like. Although the heating time also varies depending upon the heating method, a period of time in which the sheet is heated to the aforesaid preferred temperature range is enough, and the heating time can be properly selected.

In the case of, for example, vacuum forming or vacuum pressure forming that is used for thermoforming polyethylene terephthalate (PET), polystyrene (DS) or the like, a method of heating the sheet by radiation heat of a ceramic heater or the like is generally used as the heating method, and the heater temperature is in the range of a glass transition temperature of the lactic acid polymer composition to 700° C., preferably 150° C. to 500° C., more preferably 200° C. to 500° C., still more preferably 250° C. to 400° C., particularly preferably 300° C. to 400° C. The heating time is in the range of 1 second to 60 seconds, preferably 1 second to 30 seconds, more preferably 1 second to 20 seconds, still more preferably 1 second to 10 seconds, particularly preferably 1 second to 7 seconds.

In the case of hot plate pressure forming that is used for thermoforming oriented polystyrene (OPS) or the like, a method of bringing the sheet into contact with a heated metal plate or the like is generally used as the heating method, and the temperature of the metal plate is in the range of 60° C. to 200° C., preferably 70° C. to 175° C., more preferably 80° C. to 175° C., still more preferably 80° C. to 150° C. The heating time is in the range of 1 second to 20 seconds, preferably 1 second to 15 seconds, more preferably 1 second to 10 seconds, still more preferably 1 second to 5 seconds, particularly preferably 1 second to 3 seconds.

In order that the thermoformed article obtained from the sheet of the invention may have sufficient transparency, the haze of the sheet composed of the lactic acid polymer composition of the invention, as measured after the sheet is heated to a temperature between the glass transition temperature and the melting point, for example, a temperature of 60° C. to 130° C. in the case where the lactic acid polymer is polylactic acid, for 2 to 15 seconds to highly crystallize the sheet, is not more than 15%, more preferably 10% to 1%, still more preferably 7% to 1%, particularly preferably 5% to 1%, based on the sheet thickness of 450 μm.

The thermoforming to obtain the thermoformed article of the invention is carried out by a publicly known, publicly worked forming process, such as vacuum forming, vacuum pressure forming, hot plate pressure forming or press forming, while bringing the sheet into contact with a mold preset at a specific temperature in the forming. In this case, crystallization may be carried out simultaneously with the forming. The thermoformed article of the invention can be produced in a forming cycle equal to that of a general-purpose resin such as polystyrene (PS) or polyethylene terephthalate (PET).

In order to highly crystallize the sheet simultaneously with forming by the forming process using a forming machine, such as a vacuum forming machine, a vacuum pressure forming machine or a hot plate pressure forming machine, the sheet is preheated in advance, then brought into contact with a mold preset at a specific temperature and subjected to forming under vacuum, under pressure or under vacuum and pressure, optionally using a plug assist, whereby shaping is performed.

In the case where the lactic acid polymer is, for example, polylactic acid, the sheet is heated in advance to a temperature of 60° C. to 130° C., preferably 70° C. to 120° C., more preferably 80° C. to 110° C., particularly preferably 85° C. to 105° C., and then brought into contact with a mold preset at a temperature of 60° C. to 130° C., preferably 70° C. to 125° C., more preferably 80° C. to 120° C., still more preferably 90° C. to 110° C., to form the sheet.

By virtue of the sheet temperature in the above range, a thermoformed article having excellent shape and high transparency is obtained. Further, by virtue of the mold temperature in the above range, the rate of crystallization of the lactic acid polymer composition becomes high. On that account, the contact time of the sheet with a mold can be shortened, and hence, the forming cycle is shortened and the productivity becomes high.

In the case where forming is carried out using a plug assist in combination, the plug also needs to be preset at a specific temperature, preferably 40° C. to 120° C., more preferably 50° C. to 110° C., still more preferably 60° C. to 110° C., particularly preferably 70° C. to 100° C.

The optimum temperatures of the sheet, the mold and the plug vary depending upon the constitution of the lactic acid polymer composition, for example, the types and the amounts of the lactic acid polymer (A), the organic crystal nucleating agent (B), the crystallization accelerator (C) and other additives that are used when necessary. Accordingly, taking into account transparency, heat resistance, formability and productivity of the formed article, the optimum conditions can be properly determined.

In order to obtain a thermoformed article having substantially sufficient heat resistance, the contact time of the sheet with a mold needs to be in the range of 1 to 15 seconds, preferably 1 to 10 seconds, more preferably 1 to 7 seconds, still more preferably 1 to 7 seconds, particularly preferably 1 to 4 seconds. By virtue of the contact time in the above range, a thermoformed article having desired heat resistance and transparency can be obtained with excellent productivity.

The molded article and the thermoformed article composed of the lactic acid polymer composition of the invention (said articles being referred to as "molded article" simply hereinafter) are excellent in retention of volume. More specifically, the retention of volume is not less than 90%, more preferably not less than 95%. The retention of volume in the invention is determined as follows. A molded article in the form of a cup is immersed in hot water at 90° C. for 5 minutes, then the molded article in the form of a cup is taken out, and the amount (V1) of water filled in the molded article in the form of a cup was measured. The amount (V0) of water filled in the molded article in the form of a cup before immersion is measured in advance. Using these amounts, the retention of volume was calculated from the following calculation formula.

$$\text{Retention of volume (\%)} = V1/V0 \times 100$$

When the molded article composed of the lactic acid polymer composition of the invention, e.g., molded article in the form of a cup, is held in a constant temperature container at a given temperature for 2 hours, the temperature at which the molded article is deformed in the visual judgment is high, that is, the molded article has a feature of excellent heat shrinkage resistance. The heat deformation starting temperature of the molded article is preferably not lower than 65° C., more preferably not lower than 70° C., still more preferably not lower than 80° C., particularly preferably not lower than 90° C.

The molded article of the invention has excellent transparency. The transparency (value based on the thickness of 450 μm, which is measured in accordance with JIS K6714 using a haze meter manufactured by Tokyo Denshoku Co., Ltd.) of the molded article of the invention is preferably not more than 15%, more preferably 10% to 1%, still more preferably 7% to 1%, particularly 5% to 1%.

The molded article of the invention has high heat resistance with keeping high transparency that is a feature of the lactic acid polymer, and therefore, it can be widely applied to uses requiring transparency and heat resistance, for example, hot-fill containers, such as containers of pudding, jam and curry, food trays, blister containers, and general packaging containers, such as clear case.

EXAMPLES

The present invention is further described with reference to the following examples, but it should be construed that the invention is in no way limited to those examples. The lactic acid polymer (A), the organic crystal nucleating agent (B), the crystallization accelerator (C), the mold release agent and the impact resistance improver used in the examples are given below.

<Lactic Acid Polymer (A)> a1: polylactic acid (LACEA H-400, available from Mitsui Chemicals, Inc., weight-average molecular weight (Mw): 210,000, degree of dispersion (Mw/Mn): 3.2, L-form/D-form=98.2/1.8, melting point: 165° C.)

a2: polylactic acid (LACEA H-100, available from Mitsui Chemicals, Inc., weight-average molecular weight (Mw): 140,000, degree of dispersion (Mw/Mn): 3.4, L-form/D-form=98.3/1.7, melting point: 168° C.)

a3: polylactic acid (LACEA H-440, available from Mitsui Chemicals, Inc., weight-average molecular weight (Mw): 210,000, degree of dispersion (Mw/Mn): 4.2, L-form/D-form=96/4, melting point: 155° C.)

a4: polylactic acid (LACEA H-280, available from Mitsui Chemicals, Inc., weight-average molecular weight (Mw): 200,000, degree of dispersion (Mw/Mn): 4.6, L-form/D-form=88/12)

<Organic Crystal Nucleating Agent (B)>

EBL: ethylenebislauric acid amide (available from Nippon Kasei Chemical Co. Ltd., "Slipax L")

EBO: ethylenebisoleic acid amide (available from Nippon Kasei Chemical Co., Ltd., "Slipax O")

EBS: ethylenebisstearic acid amide (available from Nippon Oil & Fats Co., Ltd., "Alflow H50S")

<Crystallization Accelerator (C)> c1: acetyl tributyl citrate (ATBC, available from J-PLUS Co., Ltd.)

c2: glycerol fatty acid ester (Rikemal PL-710, available from Riken Vitamin Co., Ltd.)

c3: benzyl=2-(2-methylethoxy)ethyl=adipate (Daifatty 101, available from Daihachi Chemical Industry Co., Ltd.)

<Mold Release Agent> d1: silicone (KF-96, available from Shin-Etsu Chemical Co., Ltd.)

d2: silicone (KMP110, available from Shin-Etsu Chemical Co., Ltd.)

<Impact Resistance Improver> e1: Plamate PD-150 (trade name, available from Dainippon Ink & Chemicals, Inc.)

Example A1

In a Henschel mixer, 100 parts by weight of a polylactic acid resin a1 (LACEA H-400, available from Mitsui Chemicals, Inc.), 0.5 part by weight of an organic crystal nucleating agent EBS (available from Nippon Oil & Fats Co., Ltd., "Alflow H50S") and 1 part by weight of a crystallization accelerator c3 (Daifatty 101, available from Daihachi Chemical Industry Co., Ltd.) were mixed. Thereafter, the mixture was pelletized under the conditions of an extruder cylinder preset temperature of 190 to 220° C.

Subsequently, the resulting pellets were fed to a T-die film-forming machine (screw diameter: 50 mm, die width: 500 mm) having been preset at a cylinder temperature of 220° C. The molten resin was extruded onto a cast roll having been adjusted to a temperature of 30° C., to obtain a sheet having a thickness of 450 μm and a sheet having a thickness of 1200 μm.

The sheet having a thickness of 450 μm was subjected to heat treatment under such conditions as shown in Table 1, and crystallinity A and transparency A (haze) were measured.

The sheet having a thickness of 1200 μm was heated so that the sheet temperature should become 100° C., and then subjected to vacuum pressure thermoforming using a mold kept at 105° C. and a plug kept at 90° C. The crystallinity A given when the sheet having a thickness of 1200 μm was heated so that the sheet temperature should become 100° C. was measured. The mold had a shape of a cup having a top diameter of 100 mm, a bottom diameter of 60 mm, a height of 150 mm and a draw ratio of 1.5. The hold time in the optimum mold to obtain an excellent thermoformed article (cup) was 5 seconds. The thickness, transparency A' (haze) and heat resistance A (heat shrinkage resistance, retention of volume) of the resulting thermoformed article were evaluated.

The crystallinity A, transparency A (haze), thickness of thermoformed article, transparency A' (haze) and heat resistance A (heat shrinkage resistance, retention of volume) were measured and evaluated in the following manner. The results are set forth in Table 1.

<Crystallinity A>

Using a differential scanning calorie analytical instrument (manufactured by SEIKO), the quantity of heat of crystallization ($\Delta Hc$) and the quantity of heat of melting ($\Delta Hm$) given when the sheet was heated at a rate of 10° C./min were measured. In the present invention, the crystallinity A is a value determined by the following calculation formula.

$$\text{Crystallinity } A\ (\%) = (\text{Quantity of heat of melting} - \text{Quantity of heat of crystallization})/93 \times 100$$

<Transparency A (Haze)>

Transparency A of the sheet having a thickness of 450 μm was measured in accordance with JIS K6714 by the use of a haze meter manufactured by Tokyo Denshoku Co., Ltd.

<Thickness and Transparency A' (Haze) of Thermoformed Article>

From a side of the resulting thermoformed article (cup), a cut sample of 5 cm (lengthwise)×2 cm (crosswise) was cut out. Then, thickness of the cut sample was measured, and haze thereof was measured in the same manner as that for the transparency A.

<Heat Resistance A>

Heat Shrinkage Resistance

After the resulting thermoformed article (cup) was held in a dryer at 65° C. for 2 hours, the degree of deformation was evaluated by visual observation. The evaluation criteria are as follows.

AA: The thermoformed article was not deformed.
BB: The thermoformed article was slightly deformed.
CC: The thermoformed article was greatly deformed.

Retention of Volume

After the resulting thermoformed article (cup) was immersed in hot water at 90° C. for 5 minutes, the cup was taken out. Using the amount (V1) of water filled in the cup after immersion and the amount (V0) of water filled in the cup before immersion, retention of volume was calculated from the following calculation formula.

Retention of volume (%)=V1/V0×100

Examples A2 to A4 and Comparative Examples A1 to A5

Preparation of lactic acid polymer compositions, preparation of sheets, preparation of thermoformed articles and evaluation thereof were carried out in the same manner as in Example A1, except that the types and the amounts of the lactic acid polymer (A), the organic crystal nucleating agent (B), the crystallization accelerator (C) and the mold release agent d1 (silicone, trade name: KF-96, available from Shin-Etsu Chemical Co., ltd.), and the mold temperature and the sheet temperature in the thermoforming were changed as shown in Table 1. The results are set forth in Table 1.

having been adjusted to a temperature of 30° C. in such a manner that the thickness ratio of outer layer/intermediate layer/inner layer became 20/60/20, to obtain a three-layer sheet having a thickness of 450 μm and a three-layer sheet having a thickness of 1300 μm.

The multilayer sheet having a thickness of 450 μm was subjected to heat treatment under such conditions as shown in Table 2, then crystallinity A and transparency A (haze) of the multilayer sheet were measured, and crystallinity A of each surface layer (outer layer, inner layer) composed of the polylactic acid resin was calculated.

The multilayer sheet having a thickness of 1300 μm was heated so that the sheet temperature should become 95° C., and then subjected to vacuum pressure thermoforming using a mold having been heated to 105° C. and a plug having been preset at 90° C. The crystallinity A of the multilayer sheet given when the multilayer sheet having a thickness of 1300

TABLE 1

| | | Ex. A1 | Ex. A2 | Ex. A3 | Ex. A4 | Comp. Ex. A1 | Comp. Ex. A2 | Comp. Ex. A3 | Comp. Ex. A4 | Comp. Ex. A5 |
|---|---|---|---|---|---|---|---|---|---|---|
| Lactic acid polymer (A) | Type of polylactic acid | a1 | a2 | a2 | a1 | a1 | a1 | a1 | a2 | a2 |
| | Amount (part(s) by weight) | 100 | 96.2 | 96.2 | 98.4 | 100 | 100 | 100 | 100 | 97.9 |
| Organic crystal nucleating agent (B) | Type | EBS | EBL | EBL | EBO/EBL | — | — | EBS | EBS | EBL |
| | Amount (part(s) by weight) | 0.5 | 0.8 | 0.8 | 0.6 | 0 | 0 | 0.7 | 4 | 0.8 |
| Crystallization accelerator (C) | Type | c3 | c1 | c1 | c1 | — | — | — | c1 | c1 |
| | Amount (part(s) by weight) | 1 | 3 | 3 | 1 | 0 | 0 | 0 | 1 | 10 |
| Mold release agent | Type | — | — | d1 | — | — | — | — | d1 | — |
| | Amount (part(s) by weight) | 0 | 0 | 0.3 | 0 | 0 | 0 | 0 | 0.3 | 0 |
| Condition of heat treatment of 450 μm sheet and properties after heat treatment | Sheet temperature (° C.) | 105 | 105 | 105 | 105 | 105 | 105 | 105 | 105 | 105 |
| | Heat-treating time (sec) | 10 | 10 | 10 | 10 | 10 | 10 | 10 | 10 | 10 |
| | Crystallinity A (%) | 35 | 45 | 44 | 30 | 0 | 0 | 8 | 17 | 30 |
| | Transparency A (haze, %) | 11 | 6 | 7 | 12 | 4 | 4 | 35 | 56 | 38 |
| Thermoforming conditions | Sheet temperature (° C.) | 100 | 90 | 90 | 100 | 100 | 100 | 100 | 100 | 85 |
| | Crystallinity A (%) | 43 | 30 | 31 | 27 | 7 | 7 | 16 | 24 | 48 |
| | Mold temperature (° C.) | 105 | 100 | 105 | 105 | 30 | 105 | 105 | 105 | 90 |
| | In-mold hold time (sec) | 5 | 5 | 3 | 5 | 5 | non-formable | non-formable | 18 | 13 |
| Properties of thermoformed article | Heat resistance A | Heat shrinkage resistance | AA | AA | AA | AA | CC | — | — | AA | CC |
| | | Retention of volume (%) | ≧95 | ≧95 | ≧95 | ≧95 | ≦60 | — | — | ≧80 | 76 |
| | Transparency A' (haze, %) | 7 | 6 | 6 | 5 | 2.1 | — | — | 45 | 9 |
| | Thickness (μm) | 437 | 432 | 439 | 428 | 440 | — | — | 436 | 431 |

Example B1

In a Henschel mixer, 100 parts by weight of a polylactic acid resin a1 (LACEA H-400, available from Mitsui Chemicals, Inc.), 0.5 part by weight of an organic crystal nucleating agent EBS (available from Nippon Oil & Fats Co., Ltd., "Alflow H50S"), 1 part by weight of a crystallization accelerator c3 (Daifatty 101, available from Daihachi Chemical Industry Co., Ltd.) and 0.3 part by weight of a mold release agent d1 (silicone, "KF-96" available from Shin-Etsu Chemical Co., ltd.) were mixed. Thereafter, the mixture was pelletized under the conditions of an extruder cylinder preset temperature of 190 to 220° C.

Subsequently, the resulting pellets were fed to a hopper for outer layer and a hopper for inner layer of a three-layer T-die film-forming machine (screw diameter: 65 mm, die width: 500 mm) having been preset at a resin temperature of 220° C., while a mixture of 80 parts by weight of a polylactic acid resin a1 (LACEA H-400) and 20 parts by weight of PEC (polyethylene carbonate, glass transition temperature: 13° C., weight-average molecular weight: 150,000) was fed to a hopper for intermediate layer of the three-layer T-die film-forming machine. The molten resins were extruded onto a cast roll μm was heated so that the sheet temperature should become 100° C. was measured, and the crystallinity A of the surface layer composed of the polylactic acid resin was calculated. The mold had a shape of a cup having a top diameter of 100 mm, a bottom diameter of 60 mm, a height of 150 mm and a draw ratio of 1.5. The hold time in the optimum mold to obtain an excellent thermoformed article (cup) was 5 seconds. The thickness, transparency A' (haze) and heat resistance A (heat shrinkage resistance, retention of volume) of the resulting thermoformed article were evaluated.

The crystallinity A, transparency A (haze), thickness of thermoformed article, transparency A' (haze) and heat resistance A (heat shrinkage resistance, retention of volume) were measured and evaluated in the following manner. The results are set forth in Table 2.

<Crystallinity A>

Using a differential scanning calorie analytical instrument (manufactured by SEIKO), the quantity of heat of crystallization (ΔHc) and the quantity of heat of melting (ΔHm) given when the sheet was heated at a rate of 10° C./min were measured. In the present invention, the crystallinity A is a value determined by the following calculation formula.

Crystallinity A (%)=(Quantity of heat of melting−Quantity of heat of crystallization)/93×100

The crystallinity A of the surface layer was determined by measuring crystallinity A of the resulting multilayer sheet and then making calculation by the following calculation formula using each thickness of the inner layer, the intermediate layer and the outer layer.

Crystallinity $A$ (%) of surface layer=Crystallinity $A$(%) of multilayer sheet×total thickness of all layers/(thickness of inner layer+thickness of outer layer)

<Transparency A (Haze)>

Transparency A of the multilayer sheet having a thickness of 450 μm was measured in accordance with JIS K6714 by the use of a haze meter manufactured by Tokyo Denshoku Co., Ltd.

<Thickness and Transparency A' (Haze) of Thermoformed Article>

From a side of the resulting thermoformed article (cup), a cut sample of 5 cm (lengthwise)×2 cm (crosswise) was cut out. Then, thickness of the cut sample was measured, and haze thereof was measured in the same manner as that for the transparency A.

<Heat Resistance A>

Heat Shrinkage Resistance

After the resulting thermoformed article was held in a dryer at 65° C. for 2 hours, the degree of deformation was evaluated by visual observation. The evaluation criteria are as follows.

AA: The thermoformed article was not deformed.
BB: The thermoformed article was slightly deformed.
CC: The thermoformed article was greatly deformed.

Retention of Volume

After the resulting thermoformed article (cup) was immersed in hot water at 90° C. for 5 minutes, the cup was taken out. Using the amount (V1) of water filled in the cup after immersion and the amount (V0) of water filled in the cup before immersion, retention of volume was calculated from the following calculation formula.

Retention of volume (%)=$V1/V0$×100

Examples B2 to B4 and Comparative Examples B1 to B5

Preparation of lactic acid polymer compositions, preparation of multilayer sheets, preparation of thermoformed articles and evaluation thereof were carried out in the same manner as in Example B1, except that the types and the amounts of the lactic acid polymer (A), the organic crystal nucleating agent (B), the crystallization accelerator (C), another biodegradable resin and the mold release agent, thickness constitution of the layers, and the mold temperature and the sheet temperature in the thermoforming were changed as shown in Table 2. The results are set forth in Table 2.

TABLE 2

| | | | | Ex. B1 | Ex. B2 | Ex. B3 | Ex. B4 | Ex. B5 | Comp. Ex. B1 | Comp. Ex. B2 | Comp. Ex. B3 |
|---|---|---|---|---|---|---|---|---|---|---|---|
| Constitution of multilayer sheet | Outer layer and inner layer | Lactic acid polymer (A) | Type of polylactic acid | a1 | a1 | a2 | a2 | a2 | a1 | a1 | a2 |
| | | | Amount (part(s) by weight) | 100 | 100 | 100 | 100 | 100 | 100 | 100 | 100 |
| | | Organic crystal nucleating agent (B) | Type | EBS | EBO | EBL | EBO | EBL | — | EBO | EBS |
| | | | Amount (part(s) by weight) | 0.5 | 1 | 0.75 | 0.75 | 0.75 | — | 1 | 5 |
| | | Crystallization accelerator (C) | Type | c3 | c1 | c1 | c1 | c2 | — | — | c1 |
| | | | Amount (part(s) by weight) | 1 | 5 | 3 | 5 | 3 | — | — | 15 |
| | | Mold release agent | Type | d1 | — | d1 | — | d2 | — | — | — |
| | | | Amount (part(s) by weight) | 0.3 | — | 0.3 | — | 0.3 | — | — | — |
| | Intermediate layer | Lactic acid Polymer | Type of polylactic acid | a1 | a2 | a3 | a4 | a2 | a1 | a2 | a1 |
| | | | Amount (part(s) by weight) | 100 | 90 | 100 | 100 | 100 | 100 | 100 | 100 |
| | | Another biodegradable resin | Type | PEC | — | — | PEC | — | — | — | — |
| | | | Amount (part(s) by weight) | 10 | — | — | 10 | — | — | — | — |
| Constitution of 450 μm sheet, heat-treating conditions and properties after heat treatment | | Thickness ratio (outer layer/intermediate layer/inner layer) | | 20/60/20 | 30/40/30 | 30/40/30 | 35/30/35 | 30/40/30 | 30/40/30 | 30/40/30 | 40/20/40 |
| | | Sheet temperature (° C.) | | 100 | 100 | 100 | 100 | 100 | 100 | 100 | 100 |
| | | Heat-treating time (sec) | | 10 | 10 | 10 | 10 | 10 | 10 | 10 | 10 |
| | | Crystallinity A of surface layer (%) | | 36 | 38 | 43 | 33 | 45 | 2 | 13 | 17.3 |
| | | Transparency A after heat treatment (haze, %) | | 4.5 | 4.4 | 3.8 | 5.5 | 3.8 | 2.1 | 3.8 | 22 |
| Constitution of 1300 μm sheet and thermoforming conditions | | Thickness ratio (outer layer/intermediate layer/inner layer) | | 20/60/20 | 30/40/30 | 30/40/30 | 35/30/35 | 30/40/30 | 30/40/30 | 30/40/30 | 40/20/40 |
| | | Sheet temperature (° C.) | | 95 | 100 | 90 | 100 | 90 | 100 | 95 | 100 |
| | | Crystallinity A of surface layer (%) | | 33 | 39 | 29 | 40 | 31 | 42 | 36 | 41 |
| | | Mold temperature (° C.) | | 105 | 105 | 100 | 95 | 100 | 30 | 105 | 100 |
| | | In-mold hold time (sec) | | 5 | 7 | 4 | 8 | 4 | 12 | 25 | 25 |
| Properties of thermoformed article | | Heat resistance A  Heat shrinkage resistance | | AA | AA | AA | AA | AA | CC | CC | CC |
| | | Retention of volume (%) | | ≧95 | ≧95 | ≧95 | ≧95 | ≧95 | 46 | 68 | 54 |
| | | Transparency A' (haze, %) | | 3.6 | 3.8 | 3.2 | 3.4 | 3 | 2.1 | 16 | 18 |
| | | Thickness (μm) | | 441 | 435 | 437 | 440 | 435 | 447 | 434 | 443 |

Example C1

In a Henschel mixer, a lactic acid polymer (polylactic acid resin, LACEA H-400, available from Mitsui Chemicals, Inc.), an organic crystal nucleating agent and a crystallization accelerator were mixed in proportions shown in Table 3. Thereafter, the mixture was pelletized under the conditions of an extruder cylinder preset temperature of 170 to 210° C.

The resulting pellets were fed to a T-die film-forming machine (screw diameter: 40 mm, die width: 350 mm) having been preset at a cylinder temperature of 220° C. The molten resin was extruded onto a cast roll having been adjusted to a temperature of 30° C., to obtain a sheet having a thickness of 250 μm. The dispersed particle diameter of the organic crystal nucleating agent in the sheet was evaluated.

Subsequently, the resulting sheet was subjected to heat treatment under such conditions as shown in Table 3, and a mean dispersed particle diameter of the organic crystal nucleating agent in the sheet, crystallinity B and transparency B (haze) were evaluated. Further, the sheet was heated so that the sheet temperature should become 70° C. Thereafter, the sheet was subjected to thermoforming using a mold having been heated to 110° C., and then held in the mold for 10 seconds to obtain a thermoformed article. Then, heat resistance B of the resulting thermoformed article was evaluated.

Separately, the resulting pellets were fed to a T-die film-forming machine (screw diameter: 50 mm, die width: 500 mm) having been preset at a cylinder temperature of 220° C. The molten resin was extruded onto a cast roll having been adjusted to a temperature of 30° C., to obtain a sheet having a thickness of 1200 μm.

The sheet was heated so that the sheet temperature should become 95° C., and then subjected to vacuum pressure thermoforming using a mold kept at 100° C. and a plug kept at 90° C. The crystallinity A given when the sheet having a thickness of 1200 μm was heated so that the sheet temperature should become 95° C. was measured. The mold had a shape of a cup having a top diameter of 100 mm, a bottom diameter of 60 mm, a height of 150 mm and a draw ratio of 1.5. The hold time in the optimum mold to obtain an excellent thermoformed article (cup) was 4 seconds. The thickness, transparency A' (haze) and heat resistance A (heat shrinkage resistance, retention of volume) of the resulting thermoformed article were evaluated.

The mean dispersed particle diameter of the organic crystal nucleating agent, crystallinity A, transparency B (haze), crystallinity B, thickness of thermoformed article, transparency A' (haze), heat resistance A and heat resistance B were measured and evaluated in the following manner. The results are set forth in Table 3.

<Mean Dispersed Particle Diameter>

The dispersed state of the organic crystal nucleating agent and the crystallization accelerator in the sheet was observed by TEM. The resulting observation image was subjected to image processing, and a mean dispersed particle diameter of the dispersed particles was calculated.

<Crystallinity A>

Using a differential scanning calorie analytical instrument (manufactured by SEIKO), the quantity of heat of crystallization ($\Delta Hc$) and the quantity of heat of melting ($\Delta Hm$) given when the sheet was heated at a rate of 10° C./min were measured. In the present invention, the crystallinity A is a value determined by the following calculation formula.

Crystallinity $A$ (%)=(Quantity of heat of melting−Quantity of heat of crystallization)/93×100

<Crystallinity B>

Using a crystallinity X-ray diffractometer (Rigaku Denki Co., Ltd., Rint 1500 model), the test specimen was subjected to measurement, and a ratio of a crystal peak area to the whole area in the resulting chart was determined as crystallinity B.

<Thickness and Transparency A' (Haze) of Thermoformed Article>

From a side of the resulting thermoformed article (cup), a cut sample of 5 cm (lengthwise)×2 cm (crosswise) was cut out. Then, thickness of the cut sample was measured, and haze thereof was measured in the same manner as that for the transparency A.

<Transparency B (Haze)>

Transparency B of the sheet having a thickness of 250 μm was measured in accordance with JIS K6714 by the use of a haze meter manufactured by Tokyo Denshoku Co., Ltd.

<Heat Resistance A>

Heat Shrinkage Resistance

After the thermoformed article (cup) was held in a dryer at 65° C. for 2 hours, the degree of deformation was evaluated by visual observation. The evaluation criteria are as follows.
AA: The thermoformed article was not deformed.
BB: The thermoformed article was slightly deformed.
CC: The thermoformed article was greatly deformed.

Retention of Volume

After the thermoformed article (cup) was immersed in hot water at 90° C. for 5 minutes, the cup was taken out. Using the amount (V1) of water filled in the cup after immersion and the amount (V0) of water filled in the cup before immersion, retention of volume was calculated from the following calculation formula.

Retention of volume (%)=$V1/V0$×100

<Heat Resistance B>

Into the thermoformed article, hot water at 95° C. was poured, and the degree of deformation was evaluated by visual observation. The evaluation criteria are as follows.
AA: The thermoformed article was not deformed.
BB: The thermoformed article was slightly deformed.
CC: The thermoformed article was greatly deformed.

Examples C2 to C6 and Comparative Examples C1 to C2

Preparation of lactic acid polymer compositions, preparation of sheets, preparation of thermoformed articles and evaluation thereof were carried out in the same manner as in Example C1, except that the types and the amounts of the organic crystal nucleating agent (B) and the crystallization accelerator (C) were changed as shown in Table 3. The results are set forth in Table 3.

TABLE 3

|  |  | Ex. C1 | Ex. C2 | Ex. C3 | Ex. C4 | Ex. C5 | Ex. C6 | Comp. Ex. C1 | Comp. Ex. C2 |
|---|---|---|---|---|---|---|---|---|---|
| Lactic acid polymer (A) | Type of polylactic acid | a1 | a1 | a1 | a1 | a1 | a1 | a1 | a1 |
|  | Amount (part(s) by weight) | 100 | 100 | 100 | 100 | 100 | 100 | 100 | 100 |
| Organic crystal nucleating agent (B) | Type | EBS/EBO | EBS/EBO | EBS/EBL | EBS/EBO | EBS/EBO | EBS/EBO | — | EBS |
|  | Amount (part(s) by weight) | 0.5/0.5 | 0.5/0.5 | 0.5/0.5 | 0.5/0.5 | 0.25/0.25 | 1.5/1 | — | 0.5 |
| Crystallization accelerator (C) | Type | c1 | c3 | c1 | c2 | c3 | c1 | — | — |
|  | Amount (part(s) by weight) | 1 | 0.5 | 1 | 1 | 0.5 | 1 | — | — |
| Conditions of heat treatment of 250 μm sheet and properties after heat treatment | Sheet temperature (° C.) | 100 | 100 | 100 | 100 | 100 | 100 | 100 | 100 |
|  | Heat-treating time (sec) | 20 | 20 | 20 | 20 | 20 | 20 | 20 | 20 |
|  | Dispersed particle diameter (μm) | 0.2 | 0.2 | 0.2 | 0.3 | 0.2 | 0.8 | — | 1.3 |
|  | Crystallinity B (%) | 33 | 28 | 27 | 31 | 22 | 32 | 0 | 13 |
|  | Transparency B (haze, %) | 1.8 | 1.6 | 2.1 | 2.9 | 1.5 | 4.4 | 0.9 | 7.5 |
| Thermoformed article | Heat resistance B | AA | AA | AA | AA | AA | AA | CC | CC |

TABLE 3-continued

|  |  | Ex. C1 | Ex. C2 | Ex. C3 | Ex. C4 | Ex. C5 | Ex. C6 | Comp. Ex. C1 | Comp. Ex. C2 |
|---|---|---|---|---|---|---|---|---|---|
| Thermoforming conditions | Sheet temperature (° C.) | 95 | 100 | 90 | 95 | 95 | 100 | 100 | 100 |
|  | Crystallinity A (%) | 33 | 28 | 35 | 34 | 30 | 31 | 6 | 16 |
|  | Mold temperature (° C.) | 100 | 100 | 100 | 100 | 100 | 100 | 100 | 100 |
|  | In-mold hold time (sec) | 4 | 10 | 4 | 4 | 5 | 4 | non-formable | non-formable |
| Properties of thermoformed article | Heat resistance A | Heat shrinkage resistance | AA | AA | AA | AA | AA | AA | — | — |
|  |  | Retention of volume (%) | ≥95 | ≥95 | ≥95 | ≥95 | ≥95 | ≥95 | — | — |
|  | Transparency A' (haze, %) | 6 | 6 | 5 | 6 | 6 | 8 | — | — |
|  | Thickness (μm) | 443 | 444 | 435 | 446 | 443 | 441 | — | — |

Example D1

In a Henschel mixer, a lactic acid polymer (polylactic acid resin, LACEA H-400, available from Mitsui Chemicals, Inc.), an organic crystal nucleating agent and a crystallization accelerator were mixed in proportions shown in Table 4. Thereafter, the mixture was pelletized under the conditions of an extruder cylinder preset temperature of 170 to 210° C.

The resulting pellets were fed to a T-die film-forming machine (screw diameter: 40 mm, die width: 350 mm) having been preset at a cylinder temperature of 220° C. The molten resin was extruded onto a cast roll having been adjusted to a temperature of 30° C., to obtain a sheet having a thickness of 250 μm.

The resulting sheet was subjected to heat treatment under such conditions as shown in Table 4, and crystallinity B and transparency B (haze) were measured. Further, the sheet was heated so that the sheet temperature should become 95° C., then subjected to thermoforming using a mold having been heated to 100° C., and held in the mold for 5 seconds to obtain a thermoformed article. The crystallinity A given when the sheet was heated so that the sheet temperature should become 95° C. was measured. As the mold, a mold having a top diameter of 100 mm (lengthwise, crosswise), a bottom diameter of 75 mm (lengthwise, crosswise), a height of 30 mm and a draw ratio of about 0.27 was used. The thickness, transparency A' (haze) and heat resistance A (heat shrinkage resistance, retention of volume) of the resulting thermoformed article were evaluated.

The crystallinity A, crystallinity B, transparency B (haze), thickness of thermoformed article, transparency A' (haze) and heat resistance A were measured and evaluated in the following manner. The results are set forth in Table 4.

<Crystallinity A>

Using a differential scanning calorie analytical instrument (manufactured by SEIKO), the quantity of heat of crystallization (ΔHc) and the quantity of heat of melting (ΔHm) given when the sheet was heated at a rate of 10° C./min were measured. In the present invention, the crystallinity A is a value determined by the following calculation formula.

Crystallinity A (%)=(Quantity of heat of melting−Quantity of heat of crystallization)/93×100

<Crystallinity B>

Using a crystallinity X-ray diffractometer (Rigaku Denki Co., Ltd., Rint 1500 model), the test specimen was subjected to measurement, and a ratio of a crystal peak area to the whole area in the resulting chart was determined as crystallinity B.

<Thickness and Transparency A' (Haze) of Thermoformed Article>

From a side of the resulting thermoformed article, a cut sample of 5 cm (lengthwise)×2 cm (crosswise) was cut out. Then, thickness of the cut sample was measured, and haze thereof was measured in the same manner as that for the transparency A.

<Transparency B (Haze)>

Transparency B of the sheet having a thickness of 250 μm was measured in accordance with JIS K6714 by the use of a haze meter manufactured by Tokyo Denshoku Co., Ltd.

<Heat Resistance A>

Heat Shrinkage Resistance

After the resulting thermoformed article (cup) was held in a dryer at 65° C. for 2 hours, the degree of deformation was evaluated by visual observation. The evaluation criteria are as follows.

AA: The thermoformed article was not deformed.

BB: The thermoformed article was slightly deformed.

CC: The thermoformed article was greatly deformed.

Retention of Volume

After the resulting thermoformed article (cup) was immersed in hot water at 90° C. for 5 minutes, the cup was taken out. Using the amount (V1) of water filled in the cup after immersion and the amount (V0) of water filled in the cup before immersion, retention of volume was calculated from the following calculation formula.

Retention of volume (%)=V1/V0×100

Examples D2 to D4 and Comparative Examples D1 to D3

Preparation of lactic acid polymer compositions, preparation of sheets, preparation of thermoformed articles and evaluation thereof were carried out in the same manner as in Example D1, except that the types and the amounts of the organic crystal nucleating agent (B) and the crystallization accelerator (C), and the mold temperature and the sheet temperature in the thermoforming were changed as shown in Table 4. The results are set forth in Table 4.

TABLE 4

|  |  | Ex. D1 | Ex. D2 | Ex. D3 | Ex. D4 | Comp. Ex. D1 | Comp. Ex. D2 | Comp. Ex. D3 |
|---|---|---|---|---|---|---|---|---|
| Lactic acid polymer (A) | Type of polylactic acid | a1 | a1 | a1 | a1 | a1 | a1 | a1 |
|  | Amount (part(s) by weight) | 100 | 100 | 100 | 100 | 100 | 100 | 100 |
| Organic crystal nucleating agent (B) | Type | EBS | EBS | EBL | EBO | EBS | EBS | EBL |
|  | Amount (part(s) by weight) | 0.5 | 0.5 | 0.6 | 1 | 0.5 | 0.5 | 0.8 |
| Crystallization accelerator (C) | Type | c3 | c2 | c2 | c1 | c3 | c2 | c1 |
|  | Amount (part(s) by weight) | 0.5 | 1 | 1 | 1 | 0.5 | 1 | 3 |
| Conditions of heat treatment of 250 mm sheet and properties after heat treatment | Sheet temperature (° C.) | 100 | 100 | 100 | 100 | 100 | 100 | 100 |
|  | Heat-treating time (sec) | 10 | 10 | 10 | 20 | 20 | 20 | 10 |
|  | Crystallinity B (%) | 27 | 31 | 35 | 26 | 12 | 16 | 42 |
|  | Transparency B (haze, %) | 2.6 | 2.8 | 2.5 | 8.9 | 6.4 | 2.5 | 4 |
| Thermoforming conditions | Sheet temperature (° C.) | 95 | 95 | 85 | 100 | 70 | 70 | 135 |
|  | Crystallinity A (%) | 34 | 40 | 27 | 33 | 13 | 11 | 52 |
|  | Mold temperature (° C.) | 100 | 100 | 100 | 110 | 110 | 110 | 100 |
|  | In-mold hold time (sec) | 5 | 4 | 5 | 10 | non-formable | non-formable | non-formable |
| Properties of thermoformed article | Heat resistance A — Heat shrinkage resistance | AA | AA | AA | AA | — | — | — |
|  | Retention of volume (%) | ≧95 | ≧95 | ≧95 | ≧95 | — | — | — |
|  | Transparency A' (haze, %) | 4 | 4 | 2 | 4 | — | — | — |
|  | Thickness (μm) | 139 | 137 | 135 | 141 | — | — | — |

Example E1

In a Henschel mixer, a lactic acid polymer (polylactic acid resin, LACEA H-400, available from Mitsui Chemicals, Inc.), an organic crystal nucleating agent, a crystallization accelerator and an impact resistance improver (Plamate PD-150, available from Dainippon Ink & Chemicals, Inc.) were mixed in proportions shown in Table 5. Thereafter, the mixture was pelletized under the conditions of an extruder cylinder preset temperature of 170 to 210° C.

The resulting pellets were fed to a T-die film-forming machine (screw diameter: 40 mm, die width: 350 mm) having been preset at a cylinder temperature of 220° C. The molten resin was extruded onto a cast roll having been adjusted to a temperature of 30° C., to obtain a sheet having a thickness of 250 μm.

The resulting sheet was subjected to heat treatment under such conditions as shown in Table 5, and crystallinity B, transparency B (haze) and impact resistance were measured. Further, the sheet was heated so that the sheet temperature should become 100° C., then subjected to thermoforming using a mold having been heated to 100° C., and held in the mold for 5 seconds to obtain a thermoformed article. The crystallinity A given when the sheet was heated so that the sheet temperature should become 100° C. was measured. As the mold, a mold having a top diameter of 100 mm (lengthwise, crosswise), a bottom diameter of 75 mm (lengthwise, crosswise), a height of 30 mm and a draw ratio of about 0.27 was used. The transparency A' (haze) and heat resistance A (heat shrinkage resistance, retention of volume) of the resulting thermoformed article were evaluated.

The crystallinity A, crystallinity B, transparency B (haze), impact resistance, thickness of thermoformed article, transparency A' (haze) and heat resistance A were measured and evaluated in the following manner. The results are set forth in Table 5.

<Crystallinity A>

Using a differential scanning calorie analytical instrument (manufactured by SEIKO), the quantity of heat of crystallization ($\Delta Hc$) and the quantity of heat of melting ($\Delta Hm$) given when the sheet was heated at a rate of 10° C./min were measured. In the present invention, the crystallinity A is a value determined by the following calculation formula.

Crystallinity $A$ (%)=(Quantity of heat of melting−Quantity of heat of crystallization)/93×100

<Crystallinity B>

Using a crystallinity X-ray diffractometer (Rigaku Denki Co., Ltd., Rint 1500 model), the test specimen was subjected to measurement, and a ratio of a crystal peak area to the whole area in the resulting chart was determined as crystallinity B.

<Thickness and Transparency A' (Haze) of Thermoformed Article>

From a bottom of the resulting thermoformed article, a cut sample of 3 cm (lengthwise)×3 cm (crosswise) was cut out. Then, thickness of the cut sample was measured, and haze thereof was measured in the same manner as that for the transparency A.

<Transparency B (Haze)>

Transparency B of the sheet having a thickness of 250 μm was measured in accordance with JIS K6714 by the use of a haze meter manufactured by Tokyo Denshoku Co., Ltd.

<Impact Resistance>

In accordance with ASTM D 3763, the sheet having a thickness of 250 μm was set on a receiving tool having a diameter of 1 inch, then a striker having a diameter of ½ inch was allowed to collide with the sheet under the conditions of a rate of 3 m/sec, and the absorbed energy (high-rate impact, mJ) at the time of collision was measured.

<Heat Resistance A>

Heat Shrinkage Resistance

After the resulting thermoformed article (cup) was held in a dryer at 65° C. for 2 hours, the degree of deformation was evaluated by visual observation. The evaluation criteria are as follows.

AA: The thermoformed article was not deformed.
BB: The thermoformed article was slightly deformed.
CC: The thermoformed article was greatly deformed.

Retention of Volume

After the resulting thermoformed article (cup) was immersed in hot water at 90° C. for 5 minutes, the cup was taken out. Using the amount (V1) of water filled in the cup after immersion and the amount (V0) of water filled in the cup before immersion, retention of volume was calculated from the following calculation formula.

Retention of volume (%)=$V1/V0$×100

Comparative Example E1

Preparation of a lactic acid polymer composition, preparation of a sheet, preparation of a thermoformed article and evaluation thereof were carried out in the same manner as in Example E1, except that the types and the amounts of the organic crystal nucleating agent (B), the crystallization accelerator (C) and the impact resistance improver, and the mold temperature and the sheet temperature in the thermoforming were changed as shown in Table 5. The results are set forth in Table 5.

TABLE 5

| | | Ex. E1 | Comp. Ex. E1 |
|---|---|---|---|
| Lactic acid polymer (A) | Type of polylactic acid | a1 | a1 |
| | Amount (part(s) by weight) | 100 | 100 |
| Organic crystal nucleating agent (B) | Type | EBL | — |
| | Amount (part(s) by weight) | 0.7 | — |
| Crystallization accelerator (C) | Type | c1 | — |
| | Amount (part(s) by weight) | 1 | — |
| Impact resistance improver | Type | e1 | — |
| | Amount (part(s) by weight) | 10 | — |
| Conditions of heat treatment of 250 μm sheet and properties after heat treatment | Sheet temperature (° C.) | 100 | — |
| | Heat-treating time (sec) | 20 | — |
| | Crystallinity B (%) | 43 | 0 |
| | Transparency B (haze, %) | 4.2 | 1.8 |
| | High-rate impact (mJ) | 180 | 45 |
| Thermoforming conditions | Sheet temperature (° C.) | 85 | 70 |
| | Crystallinity A (%) | 34 | 8 |
| | Mold temperature (° C.) | 100 | 15 |
| | In-mold hold time (sec) | 5 | 5 |
| Properties of thermoformed article | Heat resistance | Heat shrinkage resistance (65° C.) | AA | CC |
| | A | Retention of volume (%) | ≧95 | 64 |
| | | Transparency A' (haze, %) | 4.5 | 2.3 |
| | | Thickness (μm) | 153 | 156 |

The invention claimed is:

1. A sheet comprising a lactic acid polymer composition, wherein the lactic acid polymer composition comprises 100 parts by weight of a lactic acid polymer (A), 0.1 to 3 parts by weight of an organic crystal nucleating agent (B) comprising an aliphatic carboxylic acid amide having an amide bond, and 0.1 to 7 parts by weight of a crystallization accelerator (C), and wherein the sheet has a crystallinity of 20% to 50% and a haze of not more than 15% based on the sheet thickness of 450 μm after the sheet is heated at a temperature of 60 to 130° C. for 1 to 15 seconds.

2. The sheet as claimed in claim 1, wherein the mean dispersed particle diameter of the organic crystal nucleating agent (B) in the sheet after the sheet is heated at a temperature of 60 to 130° C. for 1 to 15 seconds is in the range of 0.01 to 1.0 μm.

3. A multilayer sheet comprising at least one layer of the sheet of claim 1.

4. A process for producing a thermoformed article, comprising secondary-forming the multilayer sheet of claim 3.

5. The process for producing a thermoformed article as claimed in claim 4, wherein the secondary-forming is conducted by bringing the sheet into contact with a mold preset at a temperature of 90 to 130° C. for 1 to 15 seconds.

6. The process for producing a thermoformed article as claimed in claim 4, wherein the thermoformed article has heat shrinkage resistance of not lower than 65° C.

7. A thermoformed article obtained by secondary-forming the multilayer sheet of claim 3.

8. The thermoformed article as claimed in claim 7, wherein the retention of volume of the thermoformed article is not less than 90% when the thermoformed article is kept at 90° C.

9. A thermoformed article obtained by secondary-forming the sheet of claim 1.

10. The thermoformed article as claimed in claim 9, wherein the retention of volume of the thermoformed article is not less than 90% when the thermoformed article is kept at 90° C.

11. A process for producing a thermoformed article, comprising secondary-forming the sheet of claim 1.

12. The process for producing a thermoformed article as claimed in claim 11, wherein-the secondary-forming is conducted by bringing the sheet into contact with a mold preset at a temperature of 90 to 130° C. for 1 to 15 seconds.

13. The process for producing a thermoformed article as claimed in claim 11, wherein the thermoformed article has heat shrinkage resistance of not lower than 65° C.

14. The sheet as claimed in claim 1, wherein the organic crystal nucleating agent (B) comprises an ethylenebiscarboxylic acid amide.

15. The sheet as claimed in claim 1, wherein the content of the crystallization accelerator (C) is in the range of 0.5 to 7 parts by weight.

16. The sheet as claimed in claim 1, wherein the lactic acid polymer (A) is polylactic acid.

17. The sheet as claimed in claim 1, wherein the organic crystal nucleating agent (B) comprises a mixture of two or more kinds of ethylenebiscarboxylic acid amides.

18. The sheet as claimed in claim 1, wherein the crystallization accelerator (C) is at least one compound selected from the group consisting of phthalic acid derivatives, isophthalic acid derivatives, adipic acid derivatives, maleic acid derivatives, citric acid derivatives, itaconic acid derivatives, oleic acid derivatives, ricinolic acid derivatives, phosphoric acid esters, hydroxypolycarboxylic acid esters and polyhydric alcohol esters.

19. A sheet comprising a lactic acid polymer composition, wherein the lactic acid polymer composition comprises 100 parts by weight of a lactic acid polymer (A), 0.1 to 3 parts by weight of an organic crystal nucleating agent (B) comprising a mixture of two or more kinds of aliphatic carboxylic acid amides having two or more amide bonds, and 0.1 to 7 parts by weight of a crystallization accelerator (C), and wherein the sheet has a crystallinity of 20% to 50% and a haze of not more than 15% based on the sheet thickness of 450 μm after the sheet is heated at a temperature of 60 to 130° C. for 1 to 15 seconds.

20. The sheet as claimed in claim 19, wherein the mean dispersed particle diameter of the organic crystal nucleating agent (B) in the sheet after the sheet is heated at a temperature of 60 to 130° C. for 1 to 15 seconds is in the range of 0.01 to 1.0 μm.

21. A multilayer sheet comprising at least one layer of the sheet of claim 19.

22. A thermoformed article obtained by secondary-forming the multilayer sheet of claim 21.

23. The thermoformed article as claimed in claim 22, wherein the retention of volume of the thermoformed article is not less than 90% when the thermoformed article is kept at 90° C.

24. A process for producing a thermoformed article, comprising secondary-forming the multilayer sheet of claim 21.

25. The process for producing a thermoformed article as claimed in claim 24, wherein the secondary-forming is conducted by bringing the sheet into contact with a mold preset at a temperature of 90 to 130° C. for 1 to 15 seconds.

26. The process for producing a thermoformed article as claimed in claim 24, wherein the thermoformed article has heat shrinkage resistance of not lower than 65° C.

27. A thermoformed article obtained by secondary-forming the sheet of claim 19.

28. The thermoformed article as claimed in claim 27, wherein the retention of volume of the thermoformed article is not less than 90% when the thermoformed article is kept at 90° C.

29. A process for producing a thermoformed article, comprising secondary-forming the sheet of claim 19.

30. The process for producing a thermoformed article as claimed in claim 29, wherein the secondary-forming is conducted by bringing the sheet into contact with a mold preset at a temperature of 90 to 130° C. for 1 to 15 seconds.

31. The process for producing a thermoformed article as claimed in claim 29, wherein the thermoformed article has heat shrinkage resistance of not lower than 65° C.

32. The sheet as claimed in claim 19, wherein the lactic acid polymer (A) is polylactic acid.

33. The sheet as claimed in claim 19, wherein the organic crystal nucleating agent (B) comprises a mixture of two or more kinds of ethylenebiscarboxylic acid amides.

34. The sheet as claimed in claim 19, wherein the crystallization accelerator (C) is at least one compound selected from the group consisting of phthalic acid derivatives, isophthalic acid derivatives, adipic acid derivatives, maleic acid derivatives, citric acid derivatives, itaconic acid derivatives, oleic acid derivatives, ricinolic acid derivatives, phosphoric acid esters, hydroxypolycarboxylic acid esters and polyhydric alcohol esters.

* * * * *